June 25, 1963     P. VLAHOS     3,095,304
COMPOSITE PHOTOGRAPHY UTILIZING SODIUM VAPOR ILLUMINATION
Filed May 15, 1959     2 Sheets-Sheet 1
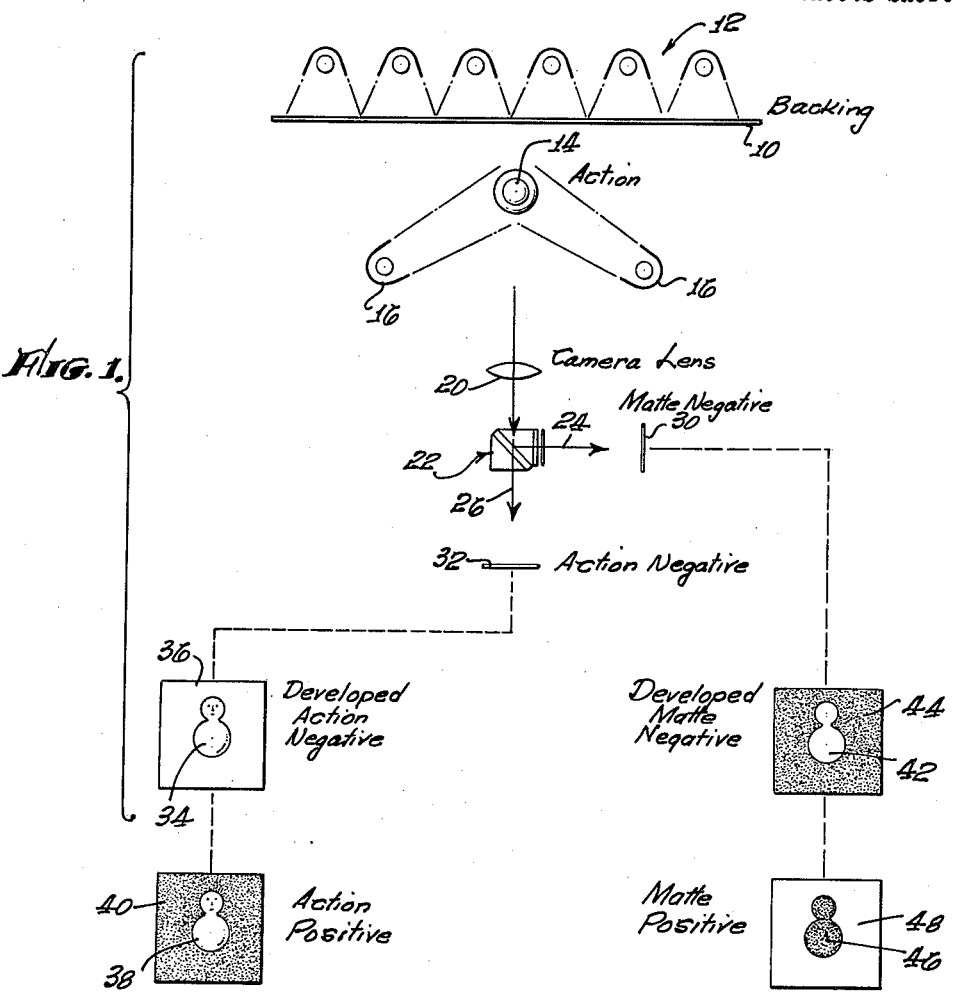
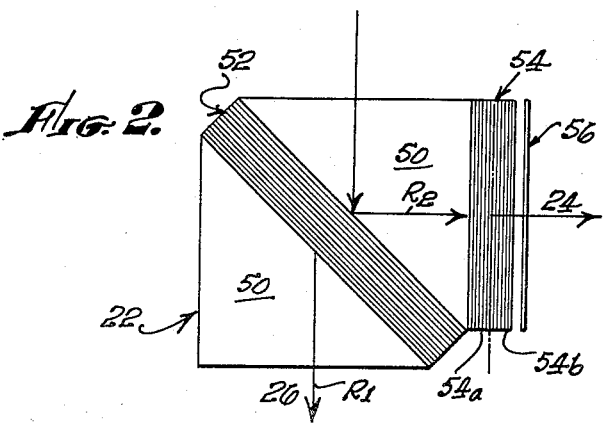
PETRO VLAHOS,
INVENTOR.
BY
Backelow & Ferris June 25, 1963  P. VLAHOS  3,095,304
COMPOSITE PHOTOGRAPHY UTILIZING SODIUM VAPOR ILLUMINATION
Filed May 15, 1958  2 Sheets-Sheet 2

INVENTOR.
PETRO VLAHOS,
BY 3,095,304
COMPOSITE PHOTOGRAPHY UTILIZING SODIUM VAPOR ILLUMINATION
Petro Vlahos, Los Angeles, Calif., assignor to Motion Picture Research Council, Inc., Los Angeles, Calif., a corporation of California
Filed May 15, 1958, Ser. No. 735,427
2 Claims. (Cl. 96—42)

This invention relates to the so-called travelling matte method for producing composite pictures. That method in general, and the present invention, may be used to produce still composites as well as motion picture composites, but has been used most largely for production of the latter.

In the travelling matte method, the foreground—usually a stage action—is commonly placed before a uniform backing and, particularly for color photography, although also desirable for black and white, illuminated with light of substantially the full range of the visible spectrum. The backing, if illuminated at all, has commonly been illuminated with radiation either at, or beyond, an extreme end of the visible spectrum; for example, with ultra-violet or infra-red radiation. Then, if two films are exposed simultaneously to the action and backing, one film immune to the backing illumination, the other immune to the foreground illumination, two negatives are produced. One of those, the action negative, carries a negative image of the action in a clear ground. The other, the matte negative, carries a clear silhouette of the action in an opaque ground. Those two negatives, or positives of them, are then used, in conjunction with a positive or negative of the desired background, to print a composite on a final film.

In the usual practice of that method, to simultaneously expose the two films, a light-splitting camera is commonly employed to first split the light beam behind the camera lens into two beams. Then, by application of appropriate absorption filters to the two beams, the action negative is subjected to a white light beam of, say, half or less than half the original action beam intensity, and the matte negative is correspondingly subjected to a backing beam of a similar fraction of the original backing beam intensity.

There are several shortcomings of the method as ordinarily practiced. One major difficulty is that both films are necessarily exposed to fractional light intensities. Another is due to the fact that the silhouette images of the matte film, generated by light of a wave-length far removed from that at the middle of the visible spectrum for which lens systems are designed, are not duplicates of the corresponding images of the action film. And that, of course, results in bright or dark borders around the action in the final composite. And another difficulty is encountered when there are transparent or semi-transparent objects in the foreground; these may turn out in the final picture to be opaque, or to be completely transparent and thus disappear.

In my improved method, illumination for the backing consists of a narrow band of wave-lengths in the middle part of the visible spectrum; and the original light beam from the action and backing is selectively divided in such a manner that substantially all the light from the foreground goes to the foreground negative, while substantially all the light from the backing goes to the matte negative. The results are either faster photography or lowering of the high lighting intensity now necessary; and also the accurate "fitting" of the action images into the background of the composite, without borders.

How these improvements are accomplished is explained in the following description of preferred procedures illustrative of the invention, such procedures being illustrated in the accompanying drawings, in which:

FIG. 1 is a schematic diagram illustrating illustrative procedures;

FIG. 2 is a schematic showing of a selective light splitting unit; and

Figure 3:
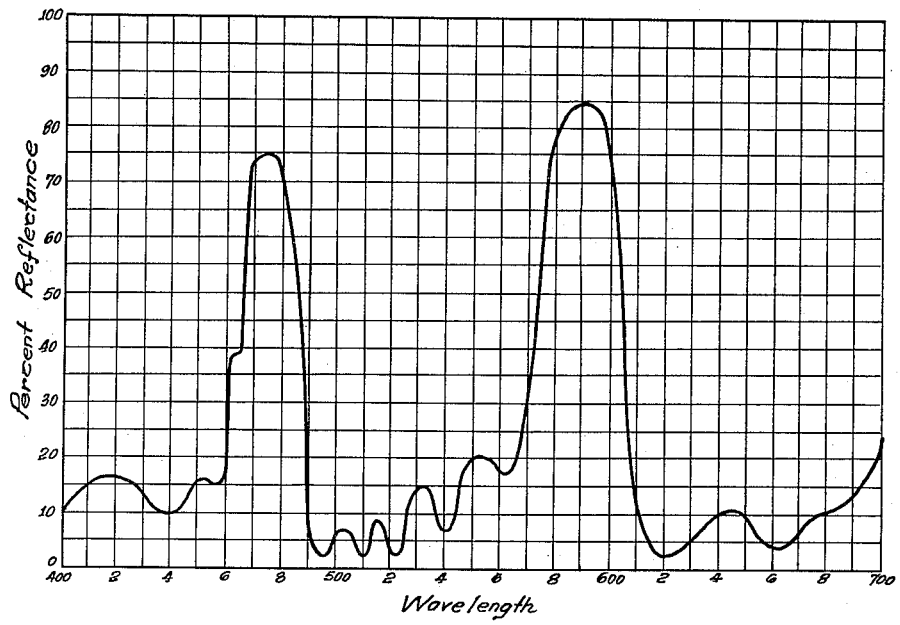
FIGS. 3 and 4 are diagrams with curves showing the performance of the unit of FIG. 2.

Referring first to the schematic showing of FIG. 1, a backing is indicated at 10, preferably a translucent and non-colored screen illuminated substantially uniformly from the rear by illumination means indicated at 12. In the present invention the illuminants 12 are preferably sodium vapor lamps which emit radiation solely in close doublet lines at 589.3 mu and 589.9 mu. The backing is consequently illuminated, preferably solely, in the yellow light of those sodium lines.

The foreground, or action, is schematically indicated at 14, illuminated by illuminants 16. This illumination is, in general, white light, or light containing at least the spectral bands to which color or black and white film is sensitive. For example, incandescent or arc lights may be used, with whatever modification is desirable for color cast. For black and white photography, any desired spectral range may be employed, providing that range includes a range or ranges other than the range immediately around the sodium lines. For reasons that will be understood from the following description of procedure, it is, in general, only necessary for any kind of photography that the foreground, or action as it will be referred to here, be illuminated with a spectral range other than the sodium line range; and whether or not that illumination range includes the sodium line range is immaterial.

With such observations in mind, the following description will treat of the procedures as if the action is illuminated with white light. It is one of the advantages of the present invention that almost any kind of light, including white, can be used for foreground illumination.

The camera lens is schematically indicated at 20, and a selective light splitting optical unit at 22. The function of unit 22, hereafter explained in further detail, is to transmit to matte negative 30, as indicated by arrow 24, substantially all of the light entering lens 20 from the backing, in a very narrow spectral light range around the sodium lines; and to transmit to action negative 32, as indicated by arrow 26, substantially all the remainder of the light entering lens 20. The result is that matte negative 30 is exposed to substantially the full light intensity received by lens 20 from backing 10, and is exposed to substantially no general light received by the lens from the action. And at the same time action negative 32, which may be black-and-white, or a color film or pack, is exposed to substantially the full light intensity received by lens 20 from the action and is not exposed to any substantial part of the light received from the backing.

The action negative, on development as a negative, carries a negative action image 34 in a clear ground 36. The action positive, printed from that negative or resulting from the development of the negative as a positive, carries a positive action image 38 in an opaque or dense ground 40.

The matte negative, which preferably carries a black and white emulsion, shows on development a clear silhouette 42 of the action in an opaque or dense ground 44. The matte positive, printed from that negative or resulting from its development as a positive, carries a dense or opaque action silhouette 46 in a clear ground 48.

As will be immediately recognized, the two positives provide complementary mattes which may then be used in any of the known manners for producing a final composite of the action in a chosen background. It is one of the advantages of the present procedure that the immediately produced films directly provide means for producing the final composite, without the necessity of any intermediary films. For example, successive exposures, in any order, of a final negative through the action positive, and through the selected background positive with the matte positive superposed, produces the final composite. Or, without the necessity of making the action positive, the final composite may be produced by printing the action negative through the matte negative, and printing a background negative through the matte positive.

The nature and functions of the selective light splitting unit 22 will now be explained, reference for this purpose being had to the schematic showing of FIG. 2. The showing and description here are merely illustrative of optical means that may be used to accomplish the procedural functions of the invention. Reference is made to Heavens, Optical Properties of Thin Solid Films, 1955; and to Patent No. 2,740,317, April 3, 1956, to Kelly and Rock; for more particular exposition of the optical designs here briefly described.

A glass block, made up of two 45°, 90° prisms 50, has between its two 45° faces a stack of thin films such as shown in much exaggerated thickness at 52. Without going into detail, for which the references may be consulted, the stack of films consists of alternating films of transparent dielectric materials having different indices of refraction, both indices being not less than and preferably greater than the index of the glass block. Thus, assuming a block of crown glass, the lower index films may be of such materials as lead fluoride or silicon monoxide, and the higher index films of such materials as zinc sulfide or titanium dioxide. Other suitable pairs of materials are given in the references.

With film thicknesses determined by formulae in which quarter wave length is a factor, the stack of films is selectively reflective of 80 to 90% of the selected wave length, and is transmissive, except for a slight amount of absorption, of all other radiation except that in the band surrounding the selected wave length and in one or more other bands, widely removed in the spectrum from the selected wave length.

A selective light divider of the type described, for the selected wave length 589.6 mu, has given a typical reflection curve as shown in FIG. 3, with approximately 85% reflection at 589.6 mu in a band averaging about 30 mu wide. As shown, another reflection band occurs at about 475 mu, in the blue. The reflected beam is indicated at R2 in FIG. 2. All the light not reflected is transmitted, amounting to about 90% of all the light falling on the selective divider block. Thus, the transmitted ray, R1 in FIG. 2, contains that percentage of the total light, being only color deficient to any substantial extent in the band centered on 589.6 mu and, to a lesser degree, in the band centered on about 475 mu. The larger loss in the band at 589.6 mu is practically immaterial, as most color film has a marked dip in the sensitivity curve in that region.

All of the reflected light in beam R2 is then filtered out with the exception of a narrow band centered on 589.6 mu by the film stack indicated at 54 in FIG. 2, and preferably also an absorption filter passing the yellow light, indicated at 56.

Figure 4:
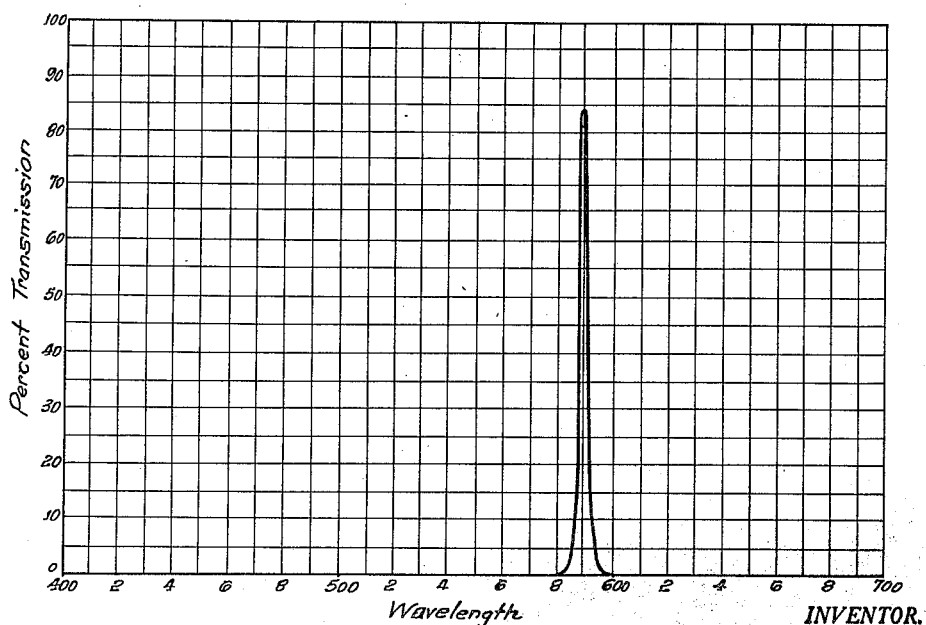

The film stack at 54 may be typically made up of multiple superposed stacks, as 54a and 54b, each like the reflection stack before described, but limiting their reflections to wave lengths spaced at opposite sides of 589.6 mu so as to transmit a high percentage at that wave length but reflect preponderantly at opposite sides of that wave length. (See particularly, Heavens at page 221.) Thus, with the reflectance of stack 54a extending to about 589.1 mu, and that of 54b beginning at about 589.9 mu, and particularly with yellow filter 56 absorbing the blue reflectance of stack 52, the ray emerging at 24 to fall on matte negative 30, comprises a narrow band of wave lengths centered on 589.6 mu as shown in the curve of FIG. 4. As shown there, the maximum width of the band finally transmitted at 24 is about 8 mu; and the total transmission efficiency at 589.6 mu of filters 54 and 56 is about 80 to 85%. Thus practically all the light reflected at 589.6 mu by stack 52 is transmitted by 54, 56 and falls on the matte negative. And, as is seen from the curve of FIG. 4, only an extremely small percentage of the total light outside the doublet 589.3–589.9 falls on the matte negative. Assuming equal illumination intensities on the action and backing, the matte film receives light from the backing and from the action in a ratio of the order of about 300 to 1; whereas the action negative receives about 90% of the action light and only about 10 to 15% of the light at 589.6 mu from the backing. This amount of light from the backing may well be below the threshold of the action film. And that amount may be reduced by illuminating the backing at an intensity well below that of the action, which is practical when using a film for the matte which is faster than that for the action.

Transparent or semi-transparent objects show up in the final composite due to light transmitted through them from the backing to the matte film.

I claim:

1. The method of producing a photographic record of a foreground and a photographic matte, which record and matte are suitable for use, together with a selected background record, for producing a composite picture;
said method including the steps of illuminating a face of a backing with light essentially confined to a substantially monochromatic band in the medial portion of the visible spectrum,
illuminating a foreground in front of the illuminated face of the backing with substantially white light,
forming a main image-forming beam of light from both the illuminated face of the backing and the foreground,
directing said main beam obliquely upon a selective reflecting element comprising a multiple array of interference layers having a reflectance peak centered adjacent said monochromatic band to remove from the main beam a reflected beam containing at least approximately 80% of the light of said monochromatic band received from the backing,
and containing foreground light within said reflectance peak amounting to less than about 10% of the total light received from the foreground,
the light transmitted by said reflecting element forming a transmitted beam which contains light from the foreground distributed effectively uniformly throughout the visible region and which includes at least approximately 90% of the total light received from the foreground,
exposing an actinic surface to said reflected beam without sharply selective absorptive filtering thereof to produce the photographic matte,
and exposing an actinic surface to said transmitted beam without sharply selective absorptive filtering thereof to produce said photographic record of the foreground.

2. The method of producing a photographic record of a foreground and a photographic matte, which record and matte are suitable for use, together with a selected background record, for producing a composite picture;
said method including the steps of illuminating a face of a backing with light essentially confined to a substantially monochromatic band in the medial portion of the visible spectrum,
illuminating a foreground in front of the illuminated face of the backing with substantially white light,
forming a main image-forming beam of light from both the illuminated face of the backing and the foreground,
directing said main beam upon a selective reflecting element comprising a multiple array of interference layers having a plurality of widely spaced reflectance peaks one of which is centered adjacent said monochromatic band to remove from the main beam a reflected beam containing at least approximately 80% of the light of said monochromatic band received from the backing, directing said reflected beam upon a second selective reflecting element comprising a multiple array of interference layers having two reflectance peaks spaced closely on opposite sides of said monochromatic band to remove from said reflected beam light within the last said peaks while transmitting at least approximately 80% of the light of said monochromatic band received from the backing, directing said reflected beam upon a color filter to remove light within the other reflectance peaks of the first said reflecting element, the resulting reflected beam containing at least about 70% of the light of said monochromatic band received from the backing and less than about 10% of the total light received from the foreground, the light transmitted by the first said reflecting element forming a transmitted beam which contains light from the foreground distributed effectively uniformly throughout the visible region and which includes at least approximately 90% of the total light received from the foreground, exposing an actinic surface to said reflected beam without further filtering thereof to produce the photographic matte, and exposing an actinic surface to said transmitted beam to produce said photographic record of the foreground.

References Cited in the file of this patent

UNITED STATES PATENTS

| | | |
|---|---|---|
| 2,693,126 | Pohl | Nov. 2, 1954 |
| 2,740,317 | Kelley et al. | Apr. 3, 1956 |

FOREIGN PATENTS

| | | |
|---|---|---|
| 633,420 | Great Britain | Dec. 19, 1949 |